United States Patent [19]

Föhl

[11] 4,403,752
[45] Sep. 13, 1983

[54] AUTOMATIC ROLL-UP DEVICE FOR SAFETY BELTS

[75] Inventor: Artur Föhl, Schorndorf, Fed. Rep. of Germany

[73] Assignee: REPA Feinstanzwerk G.m.b.H., Alfdorf, Fed. Rep. of Germany

[21] Appl. No.: 299,518

[22] Filed: Sep. 4, 1981

[30] Foreign Application Priority Data

Sep. 8, 1980 [DE] Fed. Rep. of Germany ....... 3033745

[51] Int. Cl.³ .................. A62B 35/02; B65H 75/48
[52] U.S. Cl. ........................... 242/107.2; 242/107.3
[58] Field of Search .......... 242/107.3, 107.2, 107.4 R, 242/107.4 E, 156.2, 75.43; 280/806, 807, 808, 802, 803; 297/476–480

[56] References Cited

U.S. PATENT DOCUMENTS

| 3,384,415 | 5/1968 | Monroe | 242/107.3 |
| 4,327,881 | 5/1982 | Fohl | 242/107.2 |
| 4,328,933 | 5/1982 | Loose | 242/107.2 |

FOREIGN PATENT DOCUMENTS 2355358 5/1975 Fed. Rep. of Germany ... 242/107.2

Primary Examiner—John M. Jillions
Attorney, Agent, or Firm—Herbert L. Lerner; Laurence A. Greenberg

[57] ABSTRACT

Automatic roll-up device for a safety belt having a winding shaft connected, on the one hand, to a roll-up spring and, on the other hand, to an automatic locking device and carrying a belt web winding roll, the roll-up device also having a belt brake located downstream of the winding shaft in direction of pull of the belt web, the belt brake being in the form of a movable clamping member partly looped around by the belt web and actuatable for clamping the belt web after release of the automatic locking device, the automatic roll-up device further including a braking roller displaceable in direction of the winding shaft, the belt web extending from the belt web winding roll to the braking roller and partly looped around the braking roller, the braking roller engaging with prestressing the belt-web winding roll at all varying diameters of the belt-web winding roll, the braking roller rotating counter for the belt web winding roll during movement of the belt web and, when elevated pulling force is applied to the belt web, being pressed against the belt web winding roll for clamping and locking the belt web winding roll.

4 Claims, 5 Drawing Figures

AUTOMATIC ROLL-UP DEVICE FOR SAFETY BELTS

The invention relates to an automatic roll-up device for a safety belt and, more particularly, to such an automatic roll-up device having a winding shaft connected to a roll-up spring and to an automatic locking device and carrying a belt web winding roll, the roll-up device also having a belt brake located downstream of the winding shaft in direction of pull of the belt web for unrolling the latter, the belt brake being in the form of a movable clamping member partly looped around by the belt web and actuatable for clamping the belt web after release of the automatic locking device.

With a heretofore known roll-up device for safety belts (German Published Prosecuted Application DE-AS No. 14 81 969), a belt drum for storing the belt web in the shape of a belt winding roll, and a clamping device for releasably clamping the belt in any desired withdrawn lengths are disposed within a fitting housing. A gripping device or clamping jaw is located downstream of the belt drum in the pull-out direction of the belt and is partially looped around by the belt web, another clamping jaw fixed to the housing being provided at the level of the looping path at the fitting housing. The swivelable clamping jaw is operatively connected with a spring-loaded locking device, through which, following a belt unrolling in case of a crash, both of the clamping jaws are clamped together and the locking device locks the swivelable clamping jaw, after which no further unrolling of the belt web is possible. This rollup device is expensive to construct, is difficult to operate and relatively complex with respect to clamping-jaw construction and with respect to assuring a reliable clamping operation.

It is accordingly an object of the invention to provide an automatic roll-up device of the foregoing general type, which while avoiding the difficulties of heretoforeknown automatic roll-up devices, is distinguished by an optimal clamping action and a maximally delay-free actuation of the clamping action as well as by a relatively simplified construction.

With the foregoing and other objects in view, there is provided, in accordance with the invention, an automatic roll-up device for a safety belt having a winding shaft connected to a roll-up spring and to an automatic locking device for locking the winding shaft carrying a belt web winding roll which will vary in diameter, the roll-up device also having a braking roller located downstream of the winding shaft in direction of pull of the belt web, the braking roller being in the form of a movable clamping member partly looped around by the belt web and actuatable for clamping the belt web after locking of the of the winding shaft by the automatic locking device, said braking roller lying at the periphery of the web roll and is displaceable in direction of the winding shaft to follow the changing diameter of the web roll, the belt web extending from the belt web winding roll to the braking roller and partly looped around the braking roller in a direction opposite to the direction the web is wound on the winding roll, pressing means for urging the braking roller against the belt-web winding roll at all varying diameters of the belt-web winding roll without clamping during normal operation when the pulling force applied to the belt web is insufficient to effect clamping of the belt web and, during abnormal operation when elevated pulling force is applied to the belt web an, the braking roller being pressed by said elevated pulling force against the belt web winding roll for clamping and locking the belt web winding roll.

The difficulties which occur with an indirect clamping of the belt web coming from the belt winding are avoided by the fact that the movable clamping part i.e. the clamping roller is directly pressed clampingly against the belt winding roll in the case of activation i.e. in the case of a crash. A special result produced by the fact that the brake roller or braking roller directly engages the outer periphery of the belt winding roll for any variable belt winding roll diameter, and rotates in a direction opposite that of the belt winding roll due to the special belt guidance when the belt web is rolled-up or unrolled, is that when an increased pulling force is applied to an unrolling belt web e.g. in case of a crash, the braking roller is practically instantaneously and practically without traveling any distance since it always is in contact with the belt web winding roll, forced clampingly against the belt winding roll, whereby, with normal actuation of the automatic roll-up device, the unrolling and roll-up movement of the belt web is not restricted because of the opposite directions of rotation of the belt winding roll and the brake roller.

In accordance with another feature of the invention, the automatic roll-up device includes a housing therefor, and the braking roller is slidingly displaceable in guide slots formed in the housing and extending radially to the winding shaft.

In accordance with an alternate feature of the invention, the braking roller is slidingly displaceable in guide slots formed in the housing, the guide slots having a longitudinal extension thereof disposed in a plane spaced from the rotary axis of the belt web winding roll. By thus varying the location of the guide slots with respect to the winding shaft, the clamping force applied to the belt winding roll can be increased or reduced.

In accordance with an additional feature of the invention, the braking roller is yieldingly biased against the belt web winding roll. More specifically in accordance with a concomitant feature of the invention, the roll-up device includes spring means for spring-biasing the braking roller against the belt web winding roll.

Other features which are considered as characteristic for the invention are set forth in the appended claims.

Although the invention is illustrated and described herein as embodied in an automatic roll-up device for safety belts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
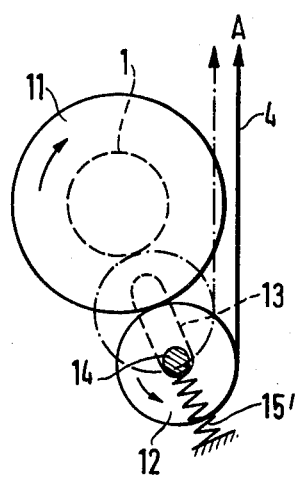
FIG. 1 is a diagrammatic side view of a first embodiment of the automatic rollup device according to the invention.

Referring now to the drawing and first, particularly, to FIGS. 1, 3, 4 and 5 thereof, a winding shaft is provided having a locking slot 2 wherein a sleeved end of web 4 stiffened by a pin 3 is locked. The winding shaft 1 is rotatably supported in side walls 5 and 6 of a U-shaped automatic device housing 7, which can be mounted by means of a bore 8 on the chassis or frame of a motor vehicle. The winding shaft 1 is operatively connected with a non-illustrated rollup spring within a protective covering 9 and with a likewise non-illustrated, conventional automatic lock within a protective covering 10 mounted on the outer surface of the opposite side wall 6. The non-illustrated automatic lock may be formed of locking teeth on the winding shaft 1, a pawl cooperating therewith, and a release mechanism in the form of an inertia or solid ball, which is shiftable upon the occurence of an abrupt slow-down of the vehicle to engage or lock the pawl with the toothing, which, in turn, immediately locks the winding shaft 1 so that the web 4 cannot be unreeled any further. The winding shaft 1 carries a belt winding roll 11 of the more or less rolled-up web 4 which, in accordance with the respective number of winding layers, has a greater or smaller diameter.

Figure 3:
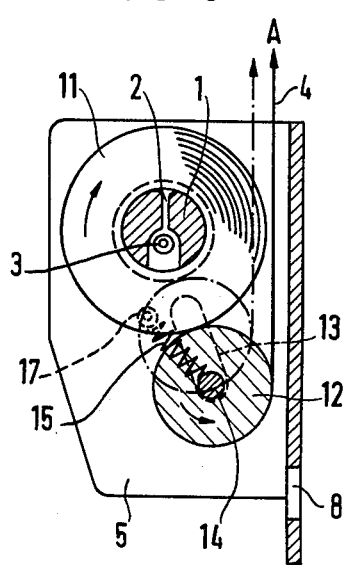
FIGS. 3, 4 and 5 are longitudinal sectional, plan and exploded views, respectively, of a practical embodiment of the basic construction according to FIG. 1.
Figure 4:
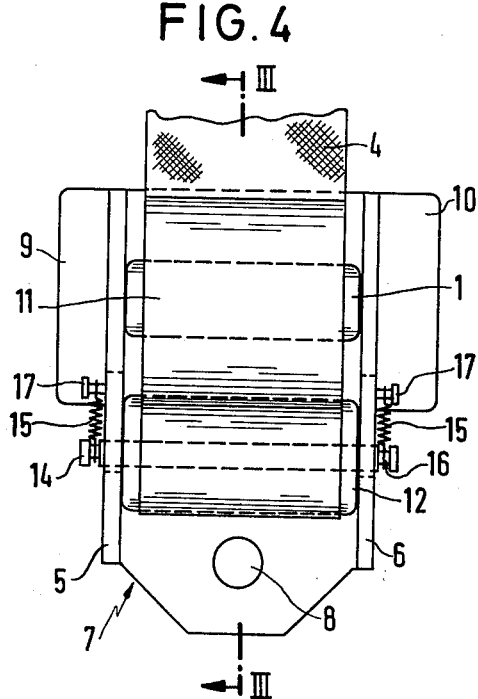
Figure 5:
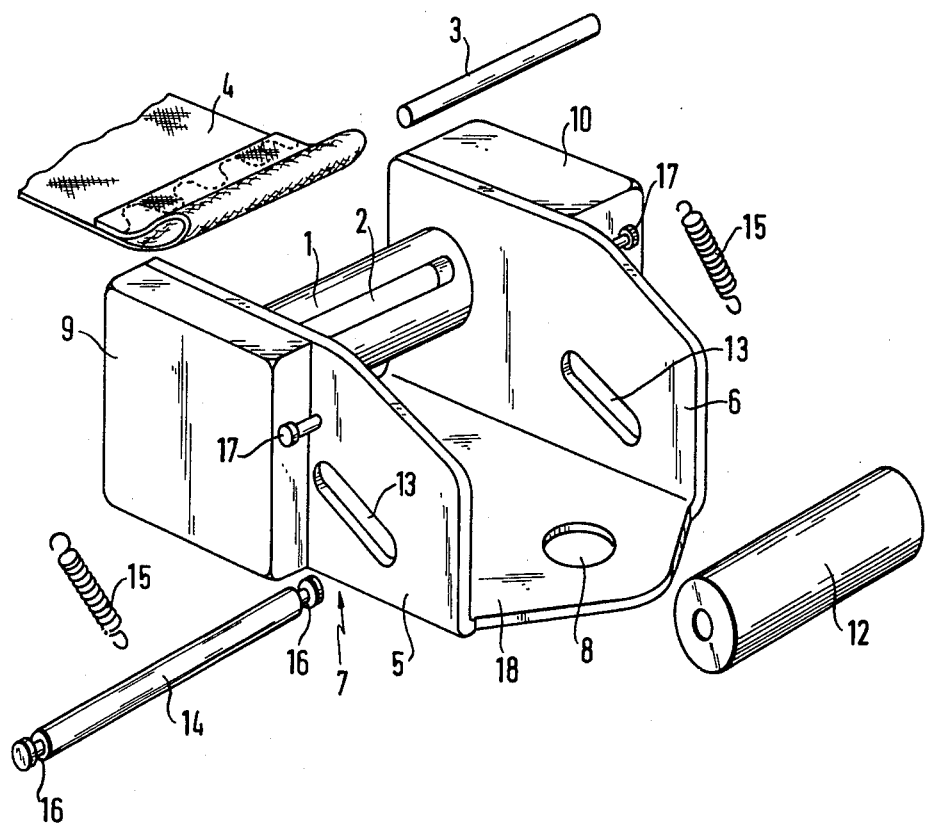

A cylindrical brake roller 2 is supported parallel to the winding shaft 1 in elongated guide slots 13, disposed radially to the winding shaft 1 in the side walls 5 and 6, so as to be shiftable in direction of the belt winding roll 11 and away from the belt winding roll 11. For this purpose, the brake roller 12 is freely rotatably supported on a roller shaft 14 which, in turn, is longitudinally shiftable guided in guide slots 13 and biased in the direction of the belt winding roll 11 by springs 15. The springs 15, in the embodiment shown in FIGS. 3 through 5 are suspended, on the one hand, in notches 16 formed on elongated ends of the roller shaft 14 projecting from the outer surfaces of the side walls 5 and 6 and, on the other hand, on pins or bolts 17 fixed to the housing 7. As shown in FIGS. 1 and 3, the belt web 4 extending from the belt winding roll 11 is passed from the belt winding roll 11 over the brake roller 12, partially looping around the brake roller 12, and is, according to the figures of the drawing, withdrawn upwardly in the direction of pull represented by the arrow A e.g. in direction of a guide or deflector fitting. For normal roll-up or unrolling of the belt web 4, the braking roller or brake roller 12 rotates counter to the belt winding roll 11 so that, between both parts 11 and 12, no frictional forces restricting movement of the web 4 are produced. The brake roller 12 consequently follows the variable diameter of the belt winding roll 11 free of any spacing therebetween. In FIGS. 1 and 3 the brake roller 12 is shown at two extreme positions, namely by solid lines, in a winding position wherein the belt winding roll 11 has a maximum diameter, and by broken lines, in a winding position wherein the belt winding roll 11 has minimum diameter i.e. is almost completely reeled off. Upon the occurrence of an increased pulling force in the direction A, e.g. in the case of a crash, the brake roller 12 immediately following the locking of the winding shaft 1, is pressed against the belt winding roll 11 in accordance with the exerted pulling force, and the belt winding roll 11 is instantaneously clamped and locked. Because the brake roller 12 directly engages the belt winding roll 11 in every diametrical position of the winding, the clamping action is practically without any delay. After the increased pulling force is slackened, the clamping action is relieved and the belt web 4 can again be freely wound up and unwound. In the main representation according to FIG. 1, instead of a tension spring according to FIGS. 3 through 5, a compression spring 15' is provided, which also has the function of forcing the brake roller 12 against the belt winding roll 11 at a predetermined pressure.

Figure 2:
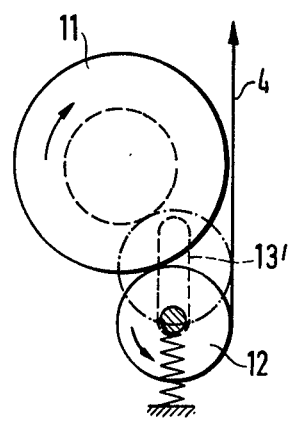
FIG. 2 is a view like that of FIG. 1 of a second embodiment of the rollup automatic machine according to the invention.

The exemplified embodiment according to FIG. 2 differs from the aforedescribed exemplified embodiment only by the position of the guide slots 13'. Whereas, in the embodiment according to FIGS. 1 and 3 through 5, the guide slots 13 are disposed substantially radially to the winding shaft 1, the guide slots 13' in FIG. 2 are disposed with the longitudinal extension thereof in a plane disposed at a spaced distance from the rotary axis of the belt winding roll 11 and, for example, extend parallel to the bottom 18 of the automatic device housing according to FIG. 5.

There is claimed:

1. Automatic roll-up device for a safety belt having a winding shaft connected to a roll-up spring and to an automatic locking device for locking the winding shaft carrying a belt web winding roll which will vary in diameter, the roll-up device also having a braking roller located downsteam of the winding shaft in direction of pull of the belt web, the braking roller being in the form of a movable clamping member partly looped around by the belt web and actuatable for clamping the belt web after locking of the winding shaft by the automatic locking device, said braking roller lying at the periphery of the web roll and displaceable in direction of the winding shaft to follow the changing diameter of the web roll, the belt web extending from the belt web winding roll to said braking roller and partly looped around said braking roller in a direction opposite to the direction the web is wound on the winding roll, pressing means for urging said braking roller against the belt-web winding roll at all varying diameters of the belt-web winding roll during normal operation without clamping the belt web and, during abnormal operation when an elevated pulling force is applied to the belt web, the braking roller being pressed by the elevated pulling force against the belt web winding roll for clamping and locking the belt web winding roll.

2. Automatic roll-up device according to claim 1 including a housing for the roll-up device, and wherein said braking roller is slidingly displaceable in guide slots formed in said housing and extending radially to the winding shaft.

3. Automatic roll-up device according to claim 1 including a housing for the roll-up device, and wherein said braking roller is slidingly displaceable in guide slots formed in said housing, said guide slots having a longitudinal extension thereof disposed in a plane spaced from the rotary axis of the belt web winding roll.

4. Automatic roll-up device according to 1, wherein said pressing means are spring means for yieldingly biasing said braking roller against said belt web winding roll.

* * * * *